(12) United States Patent
Hossan (10) Patent No.: US 6,908,573 B2
(45) Date of Patent: Jun. 21, 2005

(54) POLYMERIC RESIN BLENDS AND METHODS OF MANUFACTURE THEREOF

(75) Inventor: Robert John Hossan, Delmar, NY (US)

(73) Assignee: General Electric, Pittsfield, MA (US)

( * ) Notice: Subject to any disclaimer, the term of this patent is extended or adjusted under 35 U.S.C. 154(b) by 40 days.

(21) Appl. No.: 10/249,552

(22) Filed: Apr. 17, 2003

(65) Prior Publication Data

US 2004/0209977 A1 Oct. 21, 2004

(51) Int. Cl.$^7$ .............................. H01B 1/24; B29B 7/48; C08K 3/04; C08L 77/00
(52) U.S. Cl. ...................... 252/511; 525/53; 525/391; 525/397; 366/81; 523/348
(58) Field of Search .................... 523/348; 252/511; 366/81; 525/53, 391, 397

(56) References Cited

U.S. PATENT DOCUMENTS

| | | | |
|---|---|---|---|
| 3,392,962 A | * 7/1968 | Fritsch et al. .................. 366/83 |
| 5,088,914 A | 2/1992 | Brambilla .................... 425/208 |
| 5,264,174 A | 11/1993 | Takei et al. |
| 5,486,366 A | * 1/1996 | Song et al. ..................... 426/5 |
| 5,741,846 A | * 4/1998 | Lohmeijer et al. ........... 524/538 |
| 5,758,961 A | * 6/1998 | Deal et al. .................. 366/76.1 |
| 5,932,159 A | 8/1999 | Rauwendaal ............ 264/211.21 |
| 6,022,133 A | 2/2000 | Herring et al. ................ 366/85 |
| 6,107,415 A | * 8/2000 | Silvi et al. .................... 525/397 |
| RE36,855 E | * 9/2000 | Bredahl et al. ............... 524/270 |
| 6,352,654 B1 | * 3/2002 | Silvi et al. .................... 252/511 |
| 6,365,710 B1 | 4/2002 | Wang et al. |
| 6,627,701 B2 | 9/2003 | Adedeji et al. |
| 6,682,213 B2 | * 1/2004 | Inoue et al. ................ 366/76.4 |
| 6,776,929 B2 | * 8/2004 | Hossan et al. ............... 252/511 |
| 2002/0060378 A1 | 5/2002 | Miyamoto et al. |
| 2002/0163853 A1 | 11/2002 | Barr ............................. 366/88 |
| 2003/0067089 A1 | 4/2003 | Wang et al. |
| 2003/0092824 A1 | * 5/2003 | Bastiaens et al. ........... 524/495 |
| 2003/0232957 A1 | 12/2003 | Silvi et al. |
| 2003/0236384 A1 | 12/2003 | Silvi et al. |
| 2004/0082719 A1 | 4/2004 | Adedeji et al. |
| 2004/0114455 A1 | 6/2004 | Uphus et al. |
| 2004/0141405 A1 | 7/2004 | Blach et al. |

FOREIGN PATENT DOCUMENTS

| | | | |
|---|---|---|---|
| EP | 0 118 847 | 6/1987 | |
| EP | 0 364 634 | 10/1988 | |
| JP | 02175106 A | * 7/1990 | ............. B29B/7/84 |
| JP | 03086757 A | * 4/1991 | ........... C08L/71/12 |
| WO | WO 99/56936 | 11/1999 | |
| WO | WO 00/07799 A1 | * 2/2000 | ........... B29C/47/40 |

OTHER PUBLICATIONS

USPTO obtained translation for JP 03 86757 A (Apr. 11, 1991) Nakase et al.*
USPTO obtained translation for JP 02 175106 A (Jul. 6, 1990) Ishida et al.*
Derwent abstract Derwent–ACC–NO: 1984–232441, for EP 119947–A.*
Werner & Pfleiderer, "WP Joins Forces With PPI in Start–up of Center for Chemical & Reactive Processing (CCRP)", Processing Lines a Periodic Look at Twin Screw Technology, vol. 6 No. 4 (4pages), circa 1996.
Werner Pfleiderer, "New Mega–Compounder Greatly Increases Productivity", Processing Lines a Periodic Look at Twin Screw Technology, vol. 6 No. 2 (4 pages), circa 1996.

\* cited by examiner

Primary Examiner—Matthew A. Thexton (57) ABSTRACT

A screw for a multiple screw extruder comprises at least two conveying sections for transporting a composition comprising a polymeric resin from the feed end to the discharge end of the extruder; and at least two mixing sections comprising screw elements having two flights, wherein the ratio of the length to diameter ratio of the sum of the mixing sections to the length to diameter ratio of the screw is about 0.17 to about 0.5 and wherein the conveying sections are separated by at least one mixing section.

50 Claims, 2 Drawing Sheets

POLYMERIC RESIN BLENDS AND METHODS OF MANUFACTURE THEREOF

BACKGROUND

This disclosure relates to polymeric compositions and methods of manufacture thereof.

Compatibilized polymeric resin blends comprising at least two polymeric resins utilized in automotive body applications such as exterior body panels, bumpers, and the like, generally possess impact properties greater than or equal to about 20 kg-cm/cm in a Notched Izod test as per ASTM D 256. In order to develop these impact properties it is desirable to adequately disperse the resins in one another as well as to disperse suitable impact modifiers throughout the bulk of the blend. Such blends have generally been manufactured on twin screw extruders having three flighted screws. These extruders are characterized by high shear rates and long residence times for the blend, which provides an adequate amount of dispersion of the impact modifier thereby improving impact properties.

Modern twin screw extruders, developed and manufactured for commercial purposes in recent years are designed to operate at higher speeds with much higher throughput rates. To achieve these high throughput rates, the number of screw flights is decreased from three to two and the channel depth is increased. This results in compounding processes wherein the average shear rates for the extruded resin are reduced when compared with the shear imparted in three flighted twin screw extruders. These reduced shear rates result in lower degrees of dispersion and mixing. It would therefore be advantageous to utilize an extruder wherein the screws are designed to operate at high speed and therefore provide high throughput, but which impart an amount of shear to the polymeric blend effective to disperse the resins as well as the impact modifier adequately, so as to advantageously obtain impact properties which permit the use of these blends in automotive applications.

SUMMARY

Disclosed herein is a screw for a multiple screw extruder that comprises at least two conveying sections for transporting a composition comprising a polymeric resin from the feed end to the discharge end of the extruder; and at least two mixing sections comprising screw elements having two flights, wherein the sum of the ratios of the length to diameter ratio of the mixing sections to the length to diameter ratio of the screw is about 0.17 to about 0.5 and wherein the conveying sections are separated by at least one mixing section.

Also disclosed is a method for making an extruded composition in an extruder of a fixed diameter that comprises feeding a first polymeric resin into the first conveying section of a multiple screw extruder; plasticating the first polymeric resin in a first mixing section having a length to diameter ratio of greater than about 5; feeding a second polymeric resin into the second conveying section of the extruder; and blending the first polymeric resin with second polymeric resin in a second mixing section having a length to diameter ratio of greater than or equal to about 5; wherein the ratio of the sum of the lengths of the first and second mixing sections to the length of the screw is about 0.17 to about 0.5 and wherein the screw speed is greater than or equal to about 500 revolutions per minute.

DETAILED DESCRIPTION OF PREFERRED EMBODIMENTS

Disclosed herein is a screw for a multiple screw extruder useful for blending polymeric resins with impact modifiers in a manner so as to obtain an impact strength of over 250 kilogram centimeters (kg-cm) as measured in a Dynatup test conducted as per ASTM D 256 at room temperature. Preferably the extruder operates at a screw speed of over 500 revolutions per minute (rpm) with a specific throughput of over about 2.5 kilograms/hour/cubic centimeters (kg/hr-cm$^3$). Specific throughput as defined herein is the throughput of the extruder divided by the cube of the screw diameter. The mixing sections of the screw comprise a plurality of screw elements having two flights and the sum of the ratios of the mixing sections length to diameter ratio (hereinafter L/D ratio) to the overall L/D ratio of the screw is about 0.17 to about 0.5. The screw generally has an outer diameter to root diameter ratio of greater than or equal to 1.2 and may be a single, continuous piece of metal or assembled from several separately manufactured screw elements. The screw comprises multiple conveying sections and multiple mixing sections, wherein each mixing section is separated by at least one conveying section and wherein each conveying section is separated by at least one mixing section. In addition to the conveying and mixing sections, the screw may possess a metering section adjacent to the die, which is set at the discharge end of the extruder.

A multiple screw extruder as defined herein is an extruder having more than one screw, wherein each screw (if it is a continuous piece of metal) or assembly of screw elements is mounted upon a single shaft that transmits rotary motion to the screw. A screw formed from a single, continuous piece of metal is characterized by the fact that it cannot be transformed into a group of shorter sections except by means such as cutting with a saw or torch, which would produce the shorter sections in a condition not allowing for their reassembly into exactly the same original screw. The screw for use in the multiple screw extruder may alternatively be assembled from several separately manufactured screw elements, each of which forms just a portion of the screw as actually operated. These screw elements are rotatably disposed in the appropriate sequence on an axial shaft to form a "stack", and are generally held in place as the shaft rotates by a system of splines and keyways and a locking nut at the end of the shaft. A preferred multiple screw extruder is a twin screw extruder.

As stated above, the ratio of the outer diameter of the screw to the root diameter is greater than or equal to about 1.2, preferably greater than or equal to about 1.4 and most preferably greater than or equal to about 1.5. As defined herein, the outer diameter of the screw is the maximum diameter measured at the outer edge of the helical surface of the screw thread, while the root diameter is the minimum diameter measured between the raised helical portions of the screw thread. In an exemplary embodiment, the outer diameter of the screw is greater than or equal to about 25 millimeters (mm), with an outer diameter of greater than or equal to about 40 mm desirable.

The conveying sections of the screw are also often referred to as the feed sections. Polymeric resin is fed into the conveying section and moved forward through the extruder from the feed end towards the discharge end of the extruder. Polymeric resin may be fed to the conveying section by means of a hopper, which empties into the barrel, or may be metered into the barrel through a feed chute or a side feeder. The direction of travel of the polymeric resin in the barrel as it is transported away from the feed end by the screw is considered the "downstream" direction.

The conveying sections generally comprise single flighted screw elements that transport the polymeric resin away from the feed end of the extruder. While it is generally desirable to use single flighted screw elements in the conveying sections, it is also possible to use two and three flighted screw elements. As defined herein, a 'flight' is a raised ridge helically disposed about an elongated cylinder, which constitutes the screw. A flight may have forward or reverse pitch, and the degree of pitch may be varied. In general, the conveying sections are comprised of screw elements having a forward pitch. As stated above, the screw may have multiple conveying sections and it is preferable to have at least two conveying sections for advantageous dispersion of the components of the composition, particularly impact modifiers, within the polymeric resin. These two conveying sections are generally designated a first conveying section and a second conveying section. In a similar manner the screw may have multiple mixing sections and it is preferred to have at least two mixing sections which are designated a first mixing section and a second mixing section respectively. In an exemplary embodiment, the first mixing section is located between the first conveying section and the second conveying section and lies downstream of the first conveying section. The second mixing section is located between the second conveying section and the die. An optional metering section may be located between the second mixing section and the die. It is to be noted that that the terms 'first' and 'second' with reference to the conveying and mixing sections are utilized solely as a means of identification of these sections and should not be strictly construed to represent a position or order of placement within the extruder.

In one embodiment the ratio of the sum of the L/D ratios of the conveying sections to the L/D ratio of the screw is preferably less than about 0.8. It is more preferable to have this ratio less than or equal to about 0.6 and most preferable to have this ratio less than or equal to about 0.5. It is generally understood that while the length of the conveying and mixing sections will depend upon the diameter of the extruder, the L/D ratio is transmittable from one extruder to another irrespective of their diameters.

In another embodiment, the first conveying section has an L/D ratio of about 4 to about 12 and conveys the polymeric resin from the feed throat of the extruder towards the first mixing section of the extruder, where the partial or complete plastication of the polymeric resin occurs. The preferred L/D ratio for the first conveying section is about 8. It is generally desirable to have the ratio of the L/D of the first conveying section to the L/D of the screw preferably less than or equal to about 0.4. It is more preferable to have this ratio less than or equal to about 0.3 and most preferable to have this ratio less than or equal to about 0.2.

In general, the first conveying sections comprises a plurality of single flighted screw elements wherein each element has a L/D of about 0.5 to about 4 and a pitch of about 5 degrees to about 35 degrees. The preferred L/D of a single screw element in the first conveying section is about 1, while the preferred pitch is about 18 to about 26 degrees at the feed throat while at the proximity of the first mixing section the L/D of a single screw element in the conveying section is about 1, and the preferred pitch is about 18 to about 26 degrees.

The second conveying section has an L/D ratio of about 4 to about 12. As stated above, the second conveying section is separated from the first conveying section by the first mixing section. The polymeric resin fed into the extruder at the second conveying section may be the same or different from the polymeric resin fed to the extruder at the first conveying section. It is preferred to feed a different polymeric resin at the second conveying section from that fed into the first conveying section. The preferred L/D ratio for the second conveying section is about 6. The ratio of the L/D ratio of the second conveying section to the L/D ratio of the screw is preferably less than or equal to about 0.4. It is more preferable to have this ratio less than or equal to about 0.3 and most preferable to have this ratio less than or equal to about 0.2.

In general, the second conveying section comprises a plurality of two flighted screw elements wherein each element has a L/D of about 0.5 to about 4 and a pitch of about 5 degrees to about 35 degrees. The preferred L/D of a single screw element in the second conveying section is about 1 while the preferred pitch is about 20 to about 30 degrees at the proximity of the feed while at the proximity of the second mixing section the L/D of a single screw element in the conveying section is about 0.5 to about 1.5, while the preferred pitch is about 10 to about 20 degrees.

In general, the polymeric resin is conveyed from the conveying sections of the screw to the mixing sections. Thus the polymeric resin from the first conveying section is conveyed to the first mixing section, while the polymeric resin from the second conveying section which generally comprises polymeric resin fed into the first conveying section and any additional polymeric resin fed in at the second conveying section is fed to the adjacent second mixing section. The mixing sections generally comprise a plurality of screw elements set up in a manner so as to enable the plastication of the polymeric resin. Plastication, as defined herein, refers to the deformation of the polymeric resin beyond the limits of elastic modulus for the material. Plastication of the polymeric resin occurs as a result of the combined effect of conductive heat produced, for example, by heater bands mounted on the outside of the extruder barrel and the physical deformation (or viscous heating) to which screw action subjects the polymeric resin.

Figure 1:
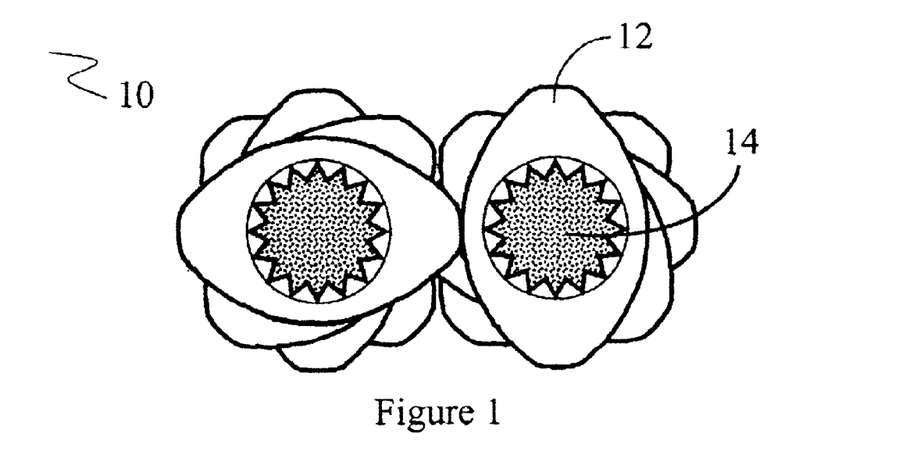
FIG. 1 is a cross sectional view of a two flighted kneading block.

In general, the screw elements utilized in the mixing sections are multi-flighted elements, with a substantial portion of the screw elements comprising two flighted elements. The mixing sections may also have three flighted, four flighted or five flighted elements. The preferred screw elements for the mixing sections are two flighted kneading blocks 10 as depicted in FIG. 1 because of their ability to facilitate dispersive mixing at high speeds and high throughput. These kneading blocks 10 are most commonly flat paddles 12 of roughly elliptical shape, which are stacked on a central shaft 14, but offset at varying angles as seen in the FIG. 1. Each paddle 12 on the shaft 14 is paired with a second paddle 12 on a second shaft 14. The shafts 14 usually both rotate in the same direction but with the angular orientation of the paddles 12 staggered at a certain angle. During rotation the second paddle wipes the outline of the first and vice versa. This wiping action keeps material from stagnating or collecting on the paddle edges.

The mixing sections are distinguished from the conveying sections by the presence of a kneading block at the feed end and a kneading block at the discharge end of the section. Alternatively, a pressure generating screw element or elements comprising a single or multiple reverse flighted screw element can be used at the discharge end of the section. The mixing section can contain short conveying elements preferably having an L/D ratio of less than 0.7 between the kneading blocks.

As discussed above, the mixing section while comprising a plurality of screw elements having two flights, may also have screw elements having more than two flights. Screw elements having more than two flights may also be interspersed with elements having two flights if desired. The L/D ratio of the sum of all two flighted elements (irrespective of the order or design of the flighted elements) to the L/D ratio of the sum of all flighted elements having more than two flights is about 0.1 to about 9.

The mixing sections may comprise kneading blocks with a forward pitch, reverse pitch or neutral pitch with respect to the direction of travel of the molten polymeric resin. As defined herein, a forward pitch-kneading block is one wherein the material is transmitted downstream towards the discharge end of the screw with the rotation of the kneading block, while a reverse pitch kneading block is one wherein the material is transmitted back towards the feed end of the screw or upstream with the rotation of the kneading block. A neutral pitch kneading block is one wherein the polymeric resin is not transmitted either forward or backwards with the rotation of the screw. It is to be understood that the general mass of polymer is conveyed from the feed end to the discharge end of the extruder even when a large number of neutral pitch kneading blocks are used since most of the elements utilized in the screw are selected for the downstream conveyance of the polymeric resin and hence the general direction of travel of the mass of polymeric resin is towards the discharge end of the extruder.

While the use of kneading blocks in general imparts shear to the polymeric resin, the use of reverse and neutral kneading blocks in particular imparts a greater amount of shear to the polymeric resin when compared with the forward kneading blocks because the polymeric resin reciprocates back and forth as it generally moves towards the discharge end of the mixing section. This moving back and forth of the polymeric resin as it is subjected to shear facilitates dispersion of the composition components, particularly the impact modifier, as well as the blending of polymeric resins. In order to increase the degree of dispersion, it is generally desirable to increase the ratio of neutral or reverse kneading blocks to forward kneading blocks. In general, it is desirable to maintain a ratio of reverse kneading blocks to forward kneading blocks of about 0.1 to about 10 within a given mixing section. In a similar manner it is generally desirable to maintain a ratio of neutral kneading blocks to forward kneading blocks of about 0.1 to about 10 within a given mixing section.

The L/D ratio of the sum of all forward kneading blocks to L/D ratio of the sum of all reverse kneading blocks in the first mixing section is about 1 to about 10. The preferred ratio for the L/D ratio of the sum of all forward kneading blocks to L/D ratio of the sum of all reverse kneading blocks in the first mixing section is about 3. Similarly the desired ratio of the sum of all forward kneading blocks to the L/D ratio of all neutral kneading blocks in the first mixing section is about 1 to about 10. The preferred ratio for the L/D ratio of the sum of all forward kneading blocks to L/D ratio of the sum of all neutral kneading blocks in the first mixing section is about 3.

It is generally desired to have the ratio of the L/D ratio of the first mixing section to the L/D ratio of the screw greater than or equal to about 0.1, preferably greater than or equal to about 0.15 and most preferably greater than or equal to about 0.2 in order to effectively blend the polymeric resins with each other and with the impact modifiers.

The L/D ratio of the sum of all forward kneading blocks to L/D ratio of the sum of all reverse kneading blocks in the second mixing section is about 1 to about 5. The preferred ratio for the L/D ratio of the sum of all forward kneading blocks to L/D ratio of the sum of all reverse kneading blocks in the second mixing section is about 1. Similarly the desired ratio of the sum of all forward kneading blocks to the L/D ratio of all neutral kneading blocks in the first mixing section is about 1 to about 10. The preferred ratio for the L/D ratio of the sum of all forward kneading blocks to L/D ratio of the sum of all neutral kneading blocks in the second mixing section is about 5. It is generally desired to have the ratio of the L/D ratio of the second mixing section to the L/D ratio of the screw greater than or equal to about 0.1, preferably greater than or equal to about 0.15 and most preferably greater than or equal to about 0.2 in order to effectively blend the polymeric resins with each other and with the impact modifiers.

It may optionally be desirable to have some double flighted forward conveying screw elements interspersed with the kneading blocks in both of the mixing sections in order to facilitate the movement of the polymeric resin towards the discharge end of the mixing sections. Double flighted reverse screw elements may also be interspersed with the kneading blocks in the mixing section. The reverse double flighted elements are generally utilized to increase the reverse flow of polymeric resins in a direction opposite to the travel of the mass of polymeric resin and act as temporary seals thus promoting added blending of the polymeric resins and dispersion of fillers, impact modifiers, antioxidants and the like.

It is generally desirable to have at least two mixing sections comprising screw elements having at least two flights, wherein the ratio of the length to diameter ratio of the sum of the mixing sections to the length to diameter ratio of the screw is about 0.17 to about 0.5. Within this range, in order to facilitate an effective dispersion of the impact modifier within the polymeric resins, the length to diameter ratio of the sum of the mixing sections to the length to diameter ratio of the screw is greater than or equal to about 0.2, preferably greater than or equal to about 0.3 and most preferably greater than or equal to about 0.4.

The screw may also optionally contain a metering section. The metering section may be located adjacent to the die and meters the amount of molten polymeric resin fed to the die. The metering section generally comprises single or double flighted screw elements and may optionally comprise one or more kneading blocks as desired. It is generally desirable to have the metering section between the second mixing section and the die of the extruder.

The screw described above may be utilized to blend a wide variety of polymeric resins with each other and may also be utilized to facilitate the dispersion of impact modifiers within a polymeric matrix so as to obtain suitable impact properties while utilizing a high throughput rate. The polymeric resins may be thermoplastic resins, blends of thermoplastic resins, thermosetting resins, blends of thermosetting resins or combinations of thermoplastic resins with thermosetting resins.

Suitable examples of thermoplastics are thermoplastic resins include polyacetal, polyacrylic, polycarbonates, polystyrenes, polyethylene, polypropylenes, polyethylene terephthalate, polybutylene terephthalate, polyamide (nylon 6, nylon 6,6, nylon 6,10, nylon 6,12, nylon 11 or nylon 12), polyamideimides, polyarylates, polyurethanes, polyarylsulfone, polyethersulfone, poly(arylene sulfide), poly (arylene ether), polyvinyl chloride, polysulfone, polyetherimide, polytetrafluoroethylene, fluorinated ethylene propylene, perfluoroalkoxy, polychlorotrifluoroethylene, polyvinylidene fluoride, polyvinyl fluoride, polyetherketone, polyether etherketone, polyether ketone ketone, polyimide, polyetherimide and combinations comprising at least one of the foregoing thermoplastic resins.

Specific non-limiting examples of blends of thermoplastic resins and thermoplastic copolymers include acrylonitrile-butadiene-styrene/polyamide, acrylonitrile butadiene styrene, polycarbonate/acrylonitrile-butadiene-styrene, acrylonitrile butadiene styrene/polyvinyl chloride, poly (arylene ether)/polystyrene, poly(arylene ether)lpolyamide, polysulfone/acrylonitrile-butadiene-styrene, polycarbonate/ thermoplastic urethane, polycarbonate/polyethylene terephthalate, polycarbonate/polybutylene terephthalate, thermoplastic elastomer alloys, polyamide/elastomers, polyester/elastomers, polyethylene terephthalatel polybutylene terephthalate, acetal/elastomer, styrene-maleic anhydride/acrylonitrile-butadiene-styrene, polyether etherketone/polyethersulfone, polyethylene/polyamide, polyethylene/polyacetal, ethylene propylene diene rubber (EPR), and combinations comprising at least one of the foregoing blends of thermoplastic resins.

Specific non-limiting examples of polymeric thermosetting resins include polyurethanes, natural rubber, synthetic rubber, epoxy, phenolic, polyesters, polyamides, silicones, and mixtures comprising any one of the foregoing thermosetting resins. Blends of thermosetting resins, as well as blends of thermoplastic resins with thermosetting can also be utilized. The preferred polymeric resin is an impact modified poly(arylene ether)lpolyamide blend.

The term poly(arylene ether) resin includes polyphenylene ether (PPE) and poly (arylene ether) copolymers; graft copolymers; poly(arylene ether) ether ionomers; and block copolymers of alkenyl aromatic compounds with poly(arylene ether)s, vinyl aromatic compounds, and poly (arylene ether), and the like; and combinations comprising at least one of the foregoing. Poly(arylene ether) resins per se, are known polymers comprising a plurality of structural units of the formula (I):

(I)

wherein for each structural unit, each $Q^1$ is independently hydrogen, halogen, primary or secondary lower alkyl (e.g., alkyl containing up to 7 carbon atoms), phenyl, haloalkyl, aminoalkyl, hydrocarbonoxy, halohydrocarbonoxy wherein at least two carbon atoms separate the halogen and oxygen atoms, or the like; and each $Q^2$ is independently hydrogen, halogen, primary or secondary lower alkyl, phenyl, haloalkyl, hydrocarbonoxy, halohydrocarbonoxy wherein at least two carbon atoms separate the halogen and oxygen atoms, or the like. Preferably, each $Q^1$ is alkyl or phenyl, especially $C_{1-4}$ alkyl, and each $Q^2$ is hydrogen.

Both homopolymer and copolymer poly(arylene ether)s are included. The preferred homopolymers are those containing 2,6-dimethylphenylene ether units. Suitable copolymers include random copolymers containing, for example, such units in combination with 2,3,6-trimethyl-1,4-phenylene ether units or copolymers derived from copolymerization of 2,6-dimethylphenol with 2,3,6-trimethylphenol. Also included are poly(arylene ether) containing moieties prepared by grafting vinyl monomers or polymers such as polystyrenes, as well as coupled poly (arylene ether) in which coupling agents such as low molecular weight polycarbonates, quinones, heterocycles and formals undergo reaction in known manner with the hydroxy groups of two poly(arylene ether) chains to produce a higher molecular weight polymer. Poly(arylene ether)s further include combinations comprising at least one of the above.

The poly(arylene ether) has a number average molecular weight of about 10,000–30,000 atomic mass units (amu) and a weight average molecular weight of about 30,000–60,000 amu, as determined by gel permeation chromatography. The poly(arylene ether) may have an intrinsic viscosity of about 0.10 to about 0.60 deciliters per gram (dl/g), preferably about 0.29 to about 0.48 dl/g, as measured in chloroform at 25° C. It is also possible to utilize a high intrinsic viscosity poly (arylene ether) and a low intrinsic viscosity poly (arylene ether) in combination. Determining an exact ratio, when two intrinsic viscosities are used, will depend somewhat on the exact intrinsic viscosities of the poly(arylene ether) used and the ultimate physical properties that are desired.

The poly(arylene ether) is typically prepared by the oxidative coupling of at least one monohydroxyaromatic compound such as 2,6-xylenol or 2,3,6-trimethylphenol. Catalyst systems are generally employed for such coupling; they typically contain at least one heavy metal compound such as a copper, manganese or cobalt compound, usually in combination with various other materials.

Particularly useful poly(arylene ether)s for many purposes are those, which comprise molecules having at least one aminoalkyl-containing end group. The aminoalkyl radical is typically located in an ortho position to the hydroxy group. Products containing such end groups may be obtained by incorporating an appropriate primary or secondary monoamine such as di-n-butylamine or dimethylamine as one of the constituents of the oxidative coupling reaction mixture. Also frequently present are 4-hydroxybiphenyl end groups, typically obtained from reaction mixtures in which a by-product diphenoquinone is present, especially in a copper-halide-secondary or tertiary amine system. A substantial proportion of the polymer molecules, typically constituting as much as about 90% by weight of the polymer, may contain at least one of said aminoalkyl-containing and 4-hydroxybiphenyl end groups.

The polyamide resins useful in poly(arylene ether)/polyamide blends are a generic family of resins known as nylons, characterized by the presence of an amide group (—C(O)NH—). Nylon-6 and nylon-6,6 are the generally preferred polyamides and are available from a variety of commercial sources. Other polyamides, however, such as nylon-4,6, nylon-12, nylon-6,10, nylon 6,9, nylon 6/6T and nylon 6.6/6T with triamine contents below about 0.5 weight percent, as well as others, such as the amorphous nylons may be useful for particular poly (arylene ether)/polyamide applications. Mixtures of various polyamides as well as various polyamide copolymers are also useful. The preferred polyamide for the poly(arylene ether)/polyamide blends is nylon-6,6.

Polyamides may be obtained by a number of processes such as those described in U.S. Pat. Nos. 2,071,250, 2,071, 251, 2,130,523, 2,130,948, 2,241,322, 2,312,966, and 2,512, 606. Nylon-6, for example, is a polymerization product of a caprolactam. Nylon-6,6 is a condensation product of adipic acid and 1,6-diaminohexane. Likewise, nylon 4,6 is a condensation product between adipic acid and 1,4-diaminobutane. Besides adipic acid, other useful diacids for the preparation of polyamides include azelaic acid, sebacic acid, dodecane diacid, as well as terephthalic and isophthatic acids, and the like. Other useful diamines include m-xylyene diamine, di-(4-aminophenyl)methane, di-(4-aminocyclohexyl) methane, 2,2-di-(4-aminophenyl) propane, 2,2-di(4-aminocyclohexyl)propane, among others. Copolymers of caprolactam with diacids and diamines are also useful.

Polyamides having a viscosity of less than or equal to about 400 milliliters/gram (ml/g) may be used in the poly (arylene ether)lpolyamide blends. It is generally desirable to use polyamides having a viscosity of greater than or equal to about 90, preferably greater than or equal to about 110 ml/g when measured in a 0.5 weight percent (wt %) solution in 96 wt % sulfuric acid in accordance with ISO 307. It is also generally desirable to utilize polyamides having a viscosity of less than or equal to about 350 ml/g, preferably less than or equal to about 240 ml/g as measured in a 0.5 weight percent (wt %) solution in 96 wt % sulfuric acid in accordance with ISO 307.

It is generally desirable to compatibilize the poly(arylene ether) resin with the polyamide resin. Compatibilized poly (arylene ether)lpolyamide blends are generally manufactured via reactive compounding techniques wherein a compatibilizing agent is added to the resins. Without being limited by theory it is generally believed that the compatibilizing agent brings about a reaction between the poly (arylene ether) and the polyamide and that these reaction products improve the compatibility between the poly (arylene ether) and polyamide. This improved compatibility results in enhanced physical properties such as, for example, increased ductility. Illustrative compatibilizing agents for compositions of poly(arylene ether) and polyamide include citric acid, maleic anhydride, fumaric acid, malic acid, as well as combinations comprising at least of the foregoing.

Impact modifiers are generally added to the poly(arylene ether)/polyamide blends to improve impact properties for use in automotive applications. Particularly suitable thermoplastic impact modifiers are block copolymers, for example, A-B diblock copolymers and A-B-A triblock copolymers having of one or two alkenyl aromatic blocks A, which are generally styrene blocks, and a rubber block, B, which is generally an isoprene or butadiene block. The butadiene block may be partially hydrogenated. Mixtures of these diblock and triblock copolymers are especially useful.

Suitable A-B and A-B-A copolymers include but are not limited to polystyrene-polybutadiene, polystyrene-poly (ethylene-propylene), polystyrene-polyisoprene, poly(a-methylstyrene)-polybutadiene, polystyrene-polybutadiene-polystyrene (SBS), polystyrene-poly(ethylene-propylene)-polystyrene, polystyrene-polyisoprene-polystyrene and poly (alpha-methylstyrene)-polybutadiene-poly (alpha-methylstyrene), as well as the selectively hydrogenated versions thereof, and the like. Mixtures of the aforementioned block copolymers are also useful. Such A-B and A-B-A block copolymers are available commercially from a number of sources, including Phillips Petroleum under the trademark SOLPRENE, Shell Chemical Co., under the trademark KRATON, Dexco under the trademark VECTOR, and Kuraray under the trademark SEPTON.

A useful amount of impact modifier is up to about 20 weight percent (wt %), with about 5 wt % to about 15 wt % preferred, and about 8 wt % to about 12 wt % especially preferred, wherein the weight percentages are based on the entire weight of the composition. In an especially preferred embodiment, the impact modifier comprises a polystyrene-polybutadiene-polystyrene block copolymer.

The poly(arylene ether)/polyamide blends may optionally be made into conductive blends by the use of conductive additives such as carbon black, carbon nanotubes, conductive metals, carbon fibers, and the like, and combinations comprising at least one of the foregoing.

Commercially available carbon blacks may be any conductive carbon black that is used in modifying the electrostatic dissipation (ESD) properties of thermoplastics resins. Such carbon blacks are sold under a variety of trade names, including but not limited to S.C.F. (Super Conductive Furnace), E.C.F. (Electric Conductive Furnace), Ketjen Black EC (available from Akzo Co., Ltd.) or acetylene black. Preferred carbon blacks are those having average particle sizes less than about 200 nanometers (nm), preferably less than about 100 nm, more preferably less than about 50 nm. Preferred conductive carbon blacks may also have surface areas greater than about 200 square meter per gram ($m^2/g$), preferably greater than about 400 $m^2/g$, yet more preferably greater than about 1000 $m^2/g$. Preferred conductive carbon blacks may have a pore volume (dibutyl phthalate absorption) greater than about 40 cubic centimeters per hundred grams ($cm^3/100$ g), preferably greater than about 100 $cm^3/100$ g, more preferably greater than about 150 $cm^3/100$ g. Preferred conductive carbon blacks may be utilized from about 2 wt % to about 25 wt % based on the total weight of the composition.

Carbon nanotubes comprising both multi-wall and single wall carbon nanotubes may also be used in the conductive poly(arylene ether)/polyamide blends. Useful carbon nanotubes are those having diameters of about 0.7 to about 500 nanometers. Carbon nanotubes may be manufactured by chemical vapor deposition processes, carbon arc based processes or laser ablation processes. Nanotubes obtained from the chemical vapor deposition processes are generally termed vapor grown carbon fibers and these are generally multi-walled nanotubes, whereas those developed from the carbon arc based processes and laser ablation processes are generally single wall nanotubes. Both single wall and multi-wall nanotubes may be used in the poly(arylene ether)/polyamide blends in amounts of about 0.1 to about 20 wt %. The conductive additives may also be added to the extruder in masterbatch form.

In an exemplary embodiment, the poly(arylene ether), the impact modifier, and compatibilizing agent are fed into a twin screw extruder into the first conveying section at the feed throat. Heating bands may be optionally used to heat the material if desired. Venting at reduced pressure may also be conducted if desired. The poly(arylene ether) resin, impact modifier and compatibilizer are then transferred from the first conveying section to the first mixing section where the components are plasticated to form a first mixture. Polyamide resin is fed into the extruder at the second conveying section, preferably through a side feeder. The second mixing section plasticates the polyamide and facilitates compatibilization with the poly(arylene ether) of the first mixture as well as the dispersion of the impact modifier. The blend is then conveyed through the metering zone to the die, where it exits the extruder in the form of a film or strand as desired.

This screw permits a number of advantageous features. It permits the manufacturing of polymeric blends at high throughput having impact properties greater than or equal to about 300 kg-cm, while operating at screw speeds of greater than or equal to about 500 rpm with a specific throughput of greater than or equal to about 2.5 kg/hr-cm thus reducing the manufacturing costs and minimizing degradation and other side reactions brought on by exposure of the blend to sustained high shear and high temperatures within the extruder.

It is especially advantageous for the manufacture of high impact poly(arylene ether)/polyamide blends having an impact strength of greater than or equal to about 300 kg-cm, while utilizing a specific energy consumption of less than or equal to about 0.3 kilowatt hour/kilogram of blend (kwhr/kg). It is generally desirable to extrude such poly(arylene ether)/polyamide blends having impact strengths of greater than or equal to about 250 kg-cm at screw speeds of greater than or equal to about 200 rpm, preferably greater than or equal to about 300 rpm, more preferably greater than or equal to about 500 rpm and most preferably greater than or equal to about 800 rpm. It is also generally desirable to extrude such poly(arylene ether)/polyamide blends having impact strengths of greater than or equal to about 300 kg-cm at specific throughputs of greater than or equal to about 1 kg/hr-cm$^3$, preferably greater than or equal to about 5 kg/hr-cm$^3$, and most preferably greater than or equal to about 9 kg/hr-cm$^3$.

The following examples, which are meant to be exemplary, not limiting, illustrate compositions and methods of manufacturing some of the various embodiments of the poly(arylene ether)/polyamide blends using various materials and the above detailed screw.

EXAMPLE 1

Figure 2:
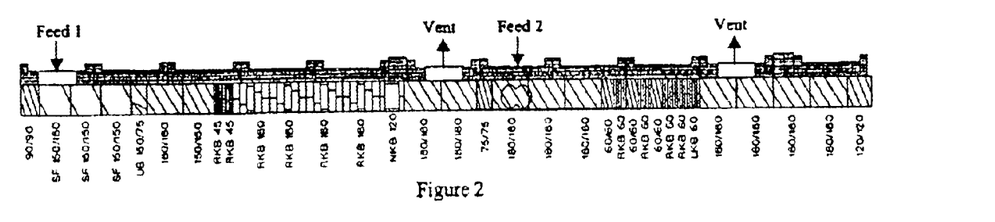
FIG. 2 is a sectional view of a screw wherein the second mixing section has three flighted kneading blocks and a length to diameter (L/D) ratio of 3.5.
Figure 4:
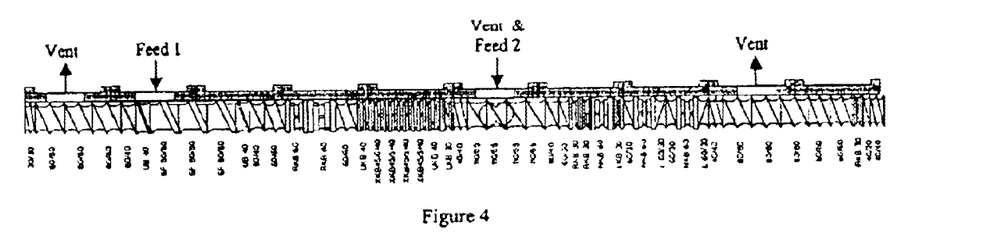
FIG. 4 is a sectional view of a screw wherein the second mixing section has two flighted kneading blocks and has three reverse flighted screw elements and a length to diameter (L/D) ratio of 6.7.
Figure 5:
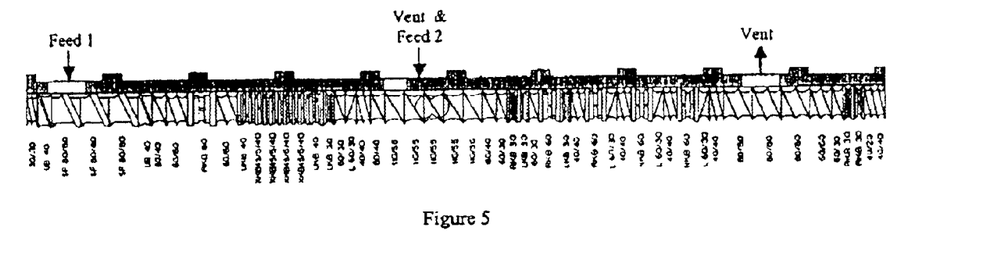
FIG. 5 is a sectional view of a screw wherein the second mixing section has two flighted kneading blocks and has five reverse flighted screw element and a length to diameter (L/D) ratio of 9.8.

This example demonstrates the advantage of utilizing a mixing section having an L/D ratio greater than or equal to about 8.8 and comprising two flighted kneading blocks in a twin screw extruder. A poly(phenylene ether)/polyamide composition having ingredients in the amounts shown in Table 1 based on the total weight of the composition, was melt blended in a 120 mm Werner and Pfleiderer (WP) twin screw extruder having 11 barrels (zones) and a die as well as in a 58 mm Werner and Pfleiderer (WP) twin screw extruder having 10 zones and a die. The sample manufactured in the 120 mm extruder is designated sample 1 and was manufactured having the screw configuration shown in FIG. 2 wherein only three flighted kneading mixing blocks were utilized in the mixing sections. The three samples designated sample 2, sample 3 and sample 4 were manufactured on the 58 mm twin screw extruder utilizing the screws shown in FIGS. 4 and 5 respectively where only two flighted kneading blocks were utilized in the second mixing section. Sample 2 was manufactured on the screw shown in FIG. 4, while samples 3 and 4 were made on the screw shown in FIG. 5. In FIGS. 2, 4 and 5 screw elements having the designation RKB, LKB and NKB refer to forward flighted elements, reverse flighted elements and neutral flighted elements respectively. SF refers to single flighted screw elements while XKB refers to 3 flighted elements. Thus it may be seen from FIG. 2 that the second mixing section for the screw has only one reverse flighted screw element, the second mixing section in FIGS. 4 and 5 show 3 and 5 reverse flighted elements respectively.

TABLE 1

| Composition | Wt % |
| --- | --- |
| Poly(2,6-dimethylphenylene ether) | 35.9 |
| Nylon 6,6 | 38.9 |
| high impact polystyrene | 15.0 |
| SBS diblock copolymer (Kraton D1101) | 9.0 |
| Citric Acid | 0.9 |
| Irganox 1076 | 0.3 |

The operating conditions for the respective extruders are shown in Tables 2 and 3 respectively. From Table 2 it may be seen that the 120 mm extruder utilized in the production of sample 1 has a second mixing section L/D ratio of 3.5, while for the samples 2, produced in the 58 mm extruder, the second mixing section had a L/D ratio of 6.7 and for samples 3 and 4 also produced in the 58 mm extruder the second mixing section had a L/D ratio of 9.8 respectively. Dynatup impact strength was measured as per ASTM D 3763. Table 3 reflects the temperature conditions (in ° C.) utilized in the extruders during the extrusion process.

TABLE 2

| Extruder Conditions | Sample 1* | Sample 2* | Sample 3 | Sample 4* |
| --- | --- | --- | --- | --- |
| Screw outer diameter (millimeters) | 120 | 58 | 58 | 58 |
| Primary mixing section L/D ratio | 7.8 | 8.1 | 8.1 | 8.1 |
| Secondary mixing section L/D ratio | 3.5 | 6.7 | 9.8 | 9.8 |
| Ratio of sum of mixing section L/D ratios to L/D of screw | 0.33 | 0.36 | 0.44 | 0.44 |
| Throughput rate (kg/hr) | 1409 | 1045 | 909 | 500 |
| Specific throughput (kg/hr-cm$^3$) | 0.8 | 5.4 | 4.6 | 2.6 |
| Screw speed (rpm) | 300 | 1000 | 1000 | 460 |
| Ratio of outer diameter to root diameter | 1.2 | 1.55 | 1.55 | 1.55 |
| Dynatup impact strength (kg-cm) | 360 | 225 | 416 | 195 |

*Comparative examples

TABLE 3

| Barrel # | Sample 1* | Sample 2* | Sample 3 | Sample 4* |
|---|---|---|---|---|
| 1 | 50 | 50 | 50 | 50 |
| 2 | 200 | 180 | 180 | 180 |
| 3 | 280 | 300 | 300 | 300 |
| 4 | 280 | 300 | 300 | 300 |
| 5 | 290 | 320 | 320 | 320 |
| 6 | 285 | 320 | 320 | 320 |
| 7 | 260 | 300 | 300 | 300 |
| 8 | 250 | 300 | 300 | 300 |
| 9 | 250 | 300 | 300 | 300 |
| 10 | 250 | 300 | 300 | 300 |
| 11 | 265 | — | — | — |
| DIE | 290 | 300 | 300 | 300 |

*Comparative examples

As may be seen from Table 2, the impact strength for sample 1 which was made in the 120 mm extruder containing three flighted kneading blocks is 360 kg-cm. The L/D ratio for the second mixing section in this case was 3.5. When an attempt was made to replicate the impact performance in a twin screw extruder using only two flighted elements with a second mixing section having an L/D ratio of 6.7, the impact strength of the resulting poly(phenylene ether)lpolyamide blend was reduced as may be seen for sample 2 to 225 kg-cm. When the L/D ratio was increased from 6.7 to 9.8, it is seen that the impact strength increased significantly to 416 kg-cm for sample 3. For sample 3, the extruder screw was operated at 1000 rpm. When the extruder screw speed was reduced from 1000 rpm to 460 rpm as seen for sample 4, the impact is again reduced to 195 kg-cm.

Thus it may be seen that by using a higher L/D ratio for the second mixing section and a higher operating speed, poly(phenylene ether)/polyamide blends having suitable impact performance may be obtained from a twin screw extruder when only two flighted kneading blocks are utilized instead of three flighted kneading blocks in the second mixing section. Thus the use of the two flighted kneading blocks instead of three flighted kneading blocks improves extruder throughput while maintaining or improving impact strength of the poly(phenylene ether)/polyamide blends.

EXAMPLE 2

Figure 3:
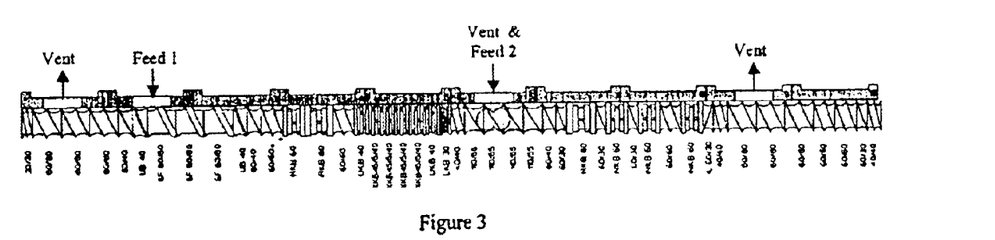
FIG. 3 is a sectional view of a screw wherein the second mixing section has 2 flighted kneading blocks and has one reverse flighted screw element and a length to diameter (L/D) ratio of 7.1.

This example demonstrates the advantages of utilizing a larger proportion of reverse kneading blocks when compared with the forward kneading blocks or neutral kneading blocks in the mixing section of a twin screw extruder that utilizes only screw elements having two flights. The composition for the poly(phenylene ether)/polyamide blend is the same as that in Example 1. FIGS. 3, 4, and 5 show different screws for a 58 mm Werner and Pfleiderer twin screw extruder wherein each successive screw contains a larger number of reverse kneading blocks in the second mixing section. For example, the screw depicted in FIG. 3 has a second mixing section comprising one reverse screw element (as indicated by screw elements having the prefix 'L' or 'LKB') and two neutral screw elements (indicated by screw elements having the prefix 'NKB') and one forward kneading block (indicated by screw elements having the prefix 'RKB'). FIG. 4 on the other hand depicts a screw having 3 reverse screw elements, 3 neutral screw elements and 2 forward screw elements. FIG. 5 has 5 reverse screw elements, 2 neutral elements and 2 forward elements. The extruder had 10 zones having temperatures shown in Table 4.

TABLE 4

| Barrel # | Temperature (° C.) |
|---|---|
| 1 | 50 |
| 2 | 180 |
| 3 | 300 |
| 4 | 300 |
| 5 | 320 |
| 6 | 320 |
| 7 | 300 |
| 8 | 300 |
| 9 | 300 |
| 10 | 300 |
| Die | 300 |

The properties for the samples made utilizing the screws depicted in FIGS. 3, 4, and 5 are shown in Tables 5, 6 and 7 respectively. Dynatup measurements were conducted as per ASTM D 3763. Tensile test measurements were conducted as per ASTM D 638. Notched Izod impact tests were conducted as per ASTM D 256. Melt Flow index tests were conducted as per ASTM D 1238. Samples 1–3 were made using the screw depicted in FIG. 3, while samples 4–6 were made utilizing the screw depicted in FIG. 4 and samples 7–13 were made using the screw depicted in FIG. 5. Tables 5, 6 and 7 also show the average values for over 20 production runs conducted in a manufacturing plant. These manufacturing plant production material were made in an extruder having only three flighted screw elements in the mixing sections of the screw, while the samples 1–13 in contrast, were manufactured using the two flighted screws depicted in FIGS. 3, 4, and 5 as described above. As may be seen from the Tables 5, 6 and 7, the impact properties of the material as measured by the notched Izod and Dynatup show that as the number of reverse flighted screw elements in the second mixing section is increased there is an increase in the impact properties of the poly(phenylene ether)/polyamide blend. Thus by increasing the number of reverse flighted screw elements with respect to the number of forward flighted screw elements, residence time in the extruder is increased promoting an increase in dispersion and improving the impact properties.

TABLE 5

| Sample Number | Feed Rate, (kg/hr) | Speed, (rpm) | SEC* (kwhr/kg) | Izod (kg-cm/cm) | MFI,** (gm/10 min) | Dynatup (kg-cm) | | Tensile | | Flexural | |
|---|---|---|---|---|---|---|---|---|---|---|---|
| | | | | | | Room Temperature | −30° C. | Strength, (kg/cm²) | Elongation (%) | Modulus, (kg/cm²) | Yield (kg/cm²) |
| Average value for over 20 runs on a 120 mm extruder | | | | 27 | 8.7 | 486 | 416 | 580 | 62 | 23,339 | 912 |
| Standard deviation | | | | 3 | 0.82 | 31 | 85 | 11 | 12 | 422 | 14 |
| 1 | 590 | 600 | 0.183 | 19 | 16.9 | 132 | 35 | 627 | 19 | 24933 | 980 |

TABLE 5-continued

| Sample Number | Feed Rate, (kg/hr) | Speed, (rpm) | SEC* (kwhr/kg) | Izod (kg-cm/cm) | MFI,** (gm/10 min) | Dynatup (kg-cm) | | Tensile | | Flexural | |
|---|---|---|---|---|---|---|---|---|---|---|---|
| | | | | | | Room Temperature | -30° C. | Strength, (kg/cm$^2$) | Elongation (%) | Modulus, (kg/cm$^2$) | Yield (kg/cm$^2$) |
| 2 | 909 | 1000 | 0.203 | 19 | 10.3 | 498 | 289 | 596 | 31 | 24399 | 945 |
| 3 | 590 | 1000 | 0.220 | 24 | 10.6 | 499 | 200 | 593 | 51 | 24483 | 944 |

*SEC = specific energy consumption
**MFI = melt flow index

TABLE 6

| Sample Number | Feed Rate, (kg/hr) | Speed, rpm | SEC*, kwhr/kg | Izod (kg-cm/cm) | MFI,** (gm/10 min) | Dynatup (kg-cm) | | Tensile | | Flexural | |
|---|---|---|---|---|---|---|---|---|---|---|---|
| | | | | | | Room Temperature | -30° C. | Strength, (kg/cm$^2$) | Elongation (%) | Modulus, (kg/cm$^2$) | Yield (kg/cm$^2$) |
| Average value for over 20 runs on a 120 mm extruder | | | | 27 | 8.7 | 486 | 416 | 580 | 62 | 23339 | 912 |
| Standard deviation | | | | 3 | 0.82 | 31 | 85 | 11 | 12 | 422 | 14 |
| 4 | 909 | 800 | 0.200 | 22 | 8.4 | 422 | 186 | 838 | 43 | 21855 | 838 |
| 5 | 909 | 1000 | 0.222 | 20 | 9.8 | 413 | 285 | 862 | 48 | 22396 | 862 |
| 6 | 1045 | 1000 | 0.218 | 22 | 8.4 | 391 | 224 | 823 | 43 | 21595 | 823 |

*SEC = specific energy consumption
**MFI = melt flow index

[t6]

TABLE 7

| Sample Number | Feed Rate, (kg/hr) | Speed, (rpm) | SEC,* (kwhr/kg) | Izod (kg-cm/cm) | MFI,** (gm/10 min) | Dynatup, (kg-cm) | | Tensile | | Flexural | |
|---|---|---|---|---|---|---|---|---|---|---|---|
| | | | | | | Room Temperature | -30° C. | Strength, (kg/cm$^2$) | Elongation (%) | Modulus, (kg/cm$^2$) | Yield (kg/cm$^2$) |
| Average value for over 20 runs on a 120 mm extruder | | | | 27 | 8.7 | 486 | 416 | 580 | 62 | 23339 | 912 |
| Standard deviation | | | | 3 | 0.82 | 31 | 85 | 11 | 12 | 422 | 14 |
| 7 | 773 | 1000 | 0.255 | 22 | 10.8 | 486 | 371 | 583 | 64 | 23450 | 902 |
| 8 | 909 | 1000 | 0.248 | 28 | 10.1 | 469 | 416 | 547 | 71 | 22446 | 860 |
| 9 | 682 | 1000 | 0.267 | 23 | 12.8 | 513 | 385 | 581 | 75 | 23500 | 897 |
| 10 | 500 | 639 | 0.242 | 23 | 11.7 | 505 | 373 | 591 | 72 | 24125 | 925 |
| 11 | 773 | 800 | 0.229 | 20 | 12.3 | 527 | 428 | 620 | 43 | 24870 | 966 |
| 12 | 773 | 1000 | 0.253 | 21 | 13.2 | 527 | 401 | 616 | 61 | 24856 | 958 |
| 13 | 909 | 1000 | 0.249 | 19 | 13.0 | 524 | 361 | 618 | 47 | 25053 | 968 |

*SEC = specific energy consumption
**MFI = melt flow index

As may be seen in the foregoing examples, high impact polymeric blends having impact strengths greater than or equal to about 250 kg-cm may be produced at screw speeds of greater than about 500 rpm. In general, it is observed that impact strengths greater than or equal to about 400 kg-cm, more preferably greater than or equal to about 500 kg-cm, may be produced at specific throughputs greater than or equal to about 4 kg/hr-cm$^3$, more preferably greater than or equal to about 5 kg/hr-cm$^3$. In general, the specific energy consumed to produce these high impact polymeric blends is an amount less than or equal to about 0.3 kwhr/kg of blend, preferably less than or equal to about 0.28 kwhr/kg of blend and most preferably less than or equal to about 0.25 kwhr/kg of blend. It may also be seen that in order to improve impact strength using the prescribed screw, a screw speed of greater than or equal to about 500 rpm, preferably greater than or equal to about 750 rpm, and most preferably greater than or equal to about 1000 rpm is desirable.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for making an extruded composition in an extruder of a fixed diameter comprises:
    feeding a first polymeric resin into a first conveying section of a multiple screw extruder;
    plasticating the first polymeric resin in a first mixing section having a length to diameter ratio of greater than about 5;
    feeding a second polymeric resin into a second conveying section of the extruder; and
    blending the first polymeric resin with second polymeric resin in a second mixing section having a length to diameter ratio of greater than or equal to about 5;

wherein the ratio of the sum of the lengths of the first and second mixing sections to the length of the screw is about 0.17 to about 0.5 and wherein the screw speed is greater than or equal to about 500 revolutions per minute.

2. The method of claim 1, wherein an additive selected from a group consisting of impact modifiers, conductivo fillers, antioxidants and compatibilizers is further added to either the first conveying section, the second conveying section or both conveying sections.

3. The method of claim 1, wherein the extruder has a specific throughput greater than or equal to about 2.5 kg/hr-cm$^3$.

4. The method of claim 1, wherein the first and second mixing section may comprise a forward flighted kneading block, reverse flighted kneading block or neutral flighted kneading block.

5. The method of claim 1, wherein a ratio of reverse kneading blocks to forward kneading blocks in the first and second mixing sections is about 1 to about 20.

6. The method of claim 1, wherein a ratio of neutral kneading blocks to forward kneading blocks in the first and second mixing sections is about 1 to about 20.

7. The method of claim 1, wherein the first and second mixing sections further comprise screw elements having more than two flights.

8. The method of claim 7, wherein a ratio of the sum of all two flighted elements to the ratio of the sum of all flighted elements having more than two flights is about 0.1 to about 9.

9. The method of claim 1, wherein the first and second polymeric resins are selected from the group consisting of thermoplastic resins, thermosetting resins and combinations of thermoplastic resins with thermosetting resins.

10. The method of claim 1, wherein the first and second polymeric resins are thermoplastic resins selected from the group consisting of polyacetal, polyacrylic, polycarbonates, polystyrenes, polyethylene, polypropylenes, polyethylene terephthalate, polybutylene terephthalate, polyamides, nylon 6, nylon 66, nylon 6,12, nylon 11, nylon 12, polyamideimides, polyarylates, polyurethanes, polyarylsulfone, polyphenylene sulfide, polyvinyl chloride, polysulfone, polyetherimide, polytetrafluoroethylene, fluorinated ethylene propylene, polychlorotrifluoroethylene, polyvinylidene fluorido, polyvinyl fluoride, polyetherketone, polyether etherketone, polyether ketone ketone, and combinations thereof.

11. The method of claim 1, wherein the first and second polymeric resin are thermosetting resins slected from the group consisting of polyurethanes, natural rubber, synthetic rubber, epoxy, phenolic, polyesters, polyamides, silicones, and mixtures thereof.

12. The method of claim 1, wherein the first polymeric resin is poly(phenylene ether) and the second polymeric resin is a polyamide.

13. An extruded composition manufactured by a method comprising:
feeding a first polymeric resin and an impact modifier into a first convoying section of a multiple screw extruder;
blending the first polymeric resin and the impact modifier in a first mixing section having a length to diameter ratio of greater than about 5;
feeding a second polymeric resin into a second conveying section of the multiple screw extruder; and
blending the first polymeric resin, the impact modifier, and the second polymeric resin in a second mixing section having a length to diameter ratio of greater than or equal to about 5; wherein the ratio of the lengths of the sum of the first and second mixing section to the length of the screw is about 0.17 to about 0.5, the screw speed is greater than about 500 revolutions per minute and wherein the composition has an impact strength greater than or equal to about 250 kilogram-centimeters.

14. The composition of claim 13, wherein the extrude has a specific throughput greater than 2.5 kg/hr-cm$^3$.

15. The composition of claim 13, wherein the first and second mixing section may comprise a forward flighted kneading block, reverse flighted kneading block or neutral flighted kneading block and wherein a ratio of reverse kneading blocks to forward kneading blocks or the ratio of neutral kneading blocks to forward kneading blocks is about 1 to about 20 in the first and second mixing sections.

16. The composition of claim 13, wherein the first and second mixing sections further comprise screw elements having more than two flights.

17. The composition of claim 13, wherein a ratio of the sum of all two flighted elements to the ratio of the sum of all flighted elements having more than two flights is about 0.1 to about 9.

18. The composition of claim 13, wherein the first and second polymeric resins are selected from the group consisting of a thermoplastic resin, a thermosetting resin and combinations of thermoplastic resins with thermosetting resin.

19. The composition of claim 13, wherein the first and second polymeric resins are thermoplastic resins selected from the group consisting of polyacetal, polyacrylic, polycarbonates, polystyrenes, polyethylene, polypropylenes, polyethylene terephthalate, polybutylene terephthalate, polyamides, polyamideimides, polyarylates, polyurethanes, polyarylsulfone, polyethersulfone, poly (arylene sulfide), poly(arylene ether), polyvinyl chloride, polysulfone, polyetherimide, polytetrafluoroethylene, fluorinated ethylene propylene, polychlorotrifluoroethylene, polyvinylidene fluoride, polyvinyl fluoride, polyetherketone, polyether etherketone, polyether ketone ketono, and combinations thereof.

20. The composition of claim 13, wherein the first and second polymeric resins are thermosetting resins selected from the group consisting of polyurethanes, natural rubber, synthetic rubber, epoxy, phenolic, polyesters, polyamides, silicones, and mixtures thereof.

21. The composition of claim 13, wherein the first polymeric resin is poly(arylene ether) end the second polymeric resin is a polyamide and the composition further comprises a compatibilizing agent.

22. The composition of claim 21, wherein the composition further comprises conductive filler selected from the group consisting of carbon black, carbon nanotubes and combinations thereof.

23. The composition of claim 13, wherein the composition further comprises conductive filler selected from the group consisting of carbon black, carbon nanotubes and combination filler thereof.

24. The composition of claim 13, wherein the composition is produced at a power consumption rate of less than or equal to about 0.3 kilowatt hour/kg.

25. A method comprising:
feeding a poly(arylene ether) and an impact modifier into a first conveying section of a multiple screw extruder;
blending the poly(arylene ether) and the impact modifier in a first mixing section having a length to diameter ratio of greater than about 5;

feeding a polyamide into a second conveying section of the multiple screw extruder; and blending the poly(arlene ether), the impact modifier, and the polyamide in a second mixing section having a length to diameter ratio of greater than or equal to about 5; wherein the ratio of the lengths of the sum of the first and second mixing section to the length of a screw is about 0.17 to about 0.5, and wherein the mixing sections consist essentially of screw elements having two flights, the screw speed is greater than about 500 revolutions per minute and wherein the composition has an impact strength greater than or equal to about 250 kilogram-centimeters.

26. The method of claim 25, wherein extruder has a specific throughput greater than 2.5 kg/hr-cm$^3$.

27. The method of claim 25, wherein the first and second mixing section may comprise a forward flighted kneading block, reverse flighted kneading block or neutral flighted kneading block.

28. The method of claim 25, wherein the first and second mixing sections further comprise screw elements having more than two flights.

29. The method of claim 25, wherein the screw speed is greater than about 500 revolutions per minute.

30. The method of claim 25, wherein an additive selected from a group consisting of impact modifiers, conductive fillers, antioxidants and compatibilizers is further added to either the first conveying section, the second conveying section or both conveying sections.

31. The method of claim 25, further comprising adding a conductive filler selected from the group consisting a carbon black, carbon nanotubes and combinations thereof to either the first conveying section, the second conveying section or both conveying sections.

32. The method of claim 25, wherein the blending in the multiple screw extruder is conducted at a power comsumption rate of less than or equal to about 0.3 kilowatt hour/kg.

33. the method of claim 27, wherein a ratio of reverse flighted kneading blocks to forward flighted kneading blocks is about 1 to about 20 in the first and second mixing sections.

34. The method of claim 27, wherein a ratio of neutral flighted kneading blocks to forward flighted kneading blocks is about 1 to about 20 in the first and second mixing sections.

35. The method of claim 25, wherein the ratio of an outer diameter to a root diameter of the screw is greater than or equal to about 1.2.

36. A method comprising:

feeding a poly(arylene ether) and an impact modifier into a first conveying section of a multiple screw extruder;

blending the poly(arlene ether) and the impact modifier in a first mixing section having a length to diameter ratio of greater than about 5;

feeding a polyamide into a second conveying section of the multiple screw extruder; and blending the poly(arylene ether), the impact modifier, and the polyamide in a second mixing section having a length to diameter ratio of greater than or equal to about 5; wherein the ratio of the lengths of the sum of the first and second mixing section to the length of a screw is about 0.17 to about 0.5, and wherein the mixing sections consist essentially of screw elements having two flights, and further wherein the ratio of an outer diameter to a root diameter of the screw is greater than or equal to about 1.2; and wherein the screw speed is greater than about 500 revolutions per minute.

37. The method of claim 36, further comprising adding a compatibilizing agent, a conductive filler, or a combination thereof to the first conveying section, the second conveying section or both conveying sections.

38. The method of claim 36, wherein an additive selected from a group consisting of impact modifiers, conductive fillers, antioxidants and compatibilizers is further added to the first conveying section, the second conveying section or both conveying sections.

39. The method of claim 36, wherein the multiple screw extruder has a specific throughput greater than 2.5 kg/hr-cm$^3$.

40. The method of claim 36, wherein the first and second mixing section may comprise a forward flighted kneading block, reverse flighted kneading block or neutral flighted kneading block.

41. the method of claim 36, wherein the screw speed is greater is than 600 rpm.

42. The method of claim 36, wherein the composition further comprises conductive filler selected from the group consisting of carbon black, carbon nanotubes and combinations thereof.

43. The method of claim 36, wherein the composition is produced at a power consumption rate of less than or equal to about 0.3 kilowatt hour/kg.

44. The method of claim 40, wherein a ratio of reverse flighted kneading blocks to forward flighted kneading blocks is about 1 to about 20 in the first and second mixing sections.

45. The method of claim 40, wherein a ratio of neutral flighted kneading blocks to forward flighted kneading blocks is about 1 to about 20 in the first and second mixing sections.

46. The method of claim 40, wherein a length to diameter ratio of a sum of all forward flighted kneading blocks to a length to diameter ratio of a sum of all reverse flighted kneading blocks in a second mixing section is about 1 to about 5.

47. The method of claim 40, wherein a length to diameter ratio of a sum of all forward flighted kneading blocks to a length to diameter ratio of a sum of all reverse flighted kneading blocks in a second mixing section is about 1.

48. The method of claim 40, wherein a ratio of a sum of all forward flighted kneading blocks to a length to diameter ratio of all neutral kneading blocks in a first mixing section is about 1 to about 10.

49. The method of claim 40, wherein a ratio of the length to diameter ratio of a sum of all forward kneading blocks to length to diameter ratio of a sum of all neutral kneading blocks in a second mixing section is about 5.

50. The method of claim 36, wherein a ratio of an outer diameter to a root diameter of the screw is greater than or equal to 1.2.

* * * * *